United States Patent [19]

Tanuma et al.

[11] Patent Number: 5,424,934
[45] Date of Patent: Jun. 13, 1995

[54] MULTIVOLTAGE POWER SUPPLY AND CONTROL METHOD THEREOF

[75] Inventors: Jiro Tanuma; Katsuyuki Ito; Shinichi Katakura; Takehiko Okubo, all of Tokyo, Japan

[73] Assignee: Oki Electric Industry Co., Ltd., Tokyo, Japan

[21] Appl. No.: 148,431

[22] Filed: Nov. 8, 1993

[30] Foreign Application Priority Data

Nov. 12, 1992 [JP] Japan .................................. 4-302611

[51] Int. Cl.6 ............................................. H02M 7/00
[52] U.S. Cl. ......................................... 363/65; 363/59
[58] Field of Search ................... 363/59, 60, 65, 71; 323/282, 283; 307/38, 41, 82

[56] References Cited

U.S. PATENT DOCUMENTS

| | | | |
|---|---|---|---|
| 4,689,734 | 8/1987 | Lang | 363/59 |
| 5,073,848 | 12/1991 | Steigerwald et al. | 363/65 |
| 5,132,895 | 7/1992 | Kase | 363/60 |
| 5,187,421 | 2/1993 | Naito | 363/59 |
| 5,266,838 | 11/1993 | Gerner | 363/65 |
| 5,274,539 | 12/1993 | Steigerwald et al. | 363/65 |
| 5,319,536 | 7/1994 | Malik | 307/82 |

FOREIGN PATENT DOCUMENTS 64-12862  1/1989  Japan ............................. H02M 3/28

*Primary Examiner*—R. Skudy
*Assistant Examiner*—Matthew V. Nguyen
*Attorney, Agent, or Firm*—Steven M. Rabin

[57] ABSTRACT

A multivoltage power supply which can output a plurality of high voltages in parallel. The voltage values of the respective outputs are feedback to an A/D converter. Each feedback signal is converted to a digital signal and the difference between the digital signal and a corresponding predetermined output voltage is then calculated in the form of a digital value. This digital value is inputted to a corresponding auto-reload timer, whereby a pulse signal having a pulse width corresponding to the digital value is output at a predetermined frequency.

11 Claims, 4 Drawing Sheets

MULTIVOLTAGE POWER SUPPLY AND CONTROL METHOD THEREOF

CROSS-REFERENCE TO RELATED APPLICATION

This application claims priority benefits of Japanese appln. No. 4-302611, filed Nov. 12, 1992, the entire disclosure of which is incorporated herein by reference.

BACKGROUND OF THE INVENTION

1) Field of the Invention

This invention relates to a multivoltage power supply and also to a method for controlling the same.

2. Description of the Related Art

A multivoltage power supply has an ever-increasing importance as a power supply for various electronic equipment, because recent electronic equipment is increasingly sophisticated in its functions and, even if they externally look as a single product or unit, they are internally a combination of plural units which require different voltages.

One example of such multivoltage power supply is disclosed in Japanese Patent Application Laid-Open (Kokai) No. SHO 64-12862. This multivoltage power supply converts each output voltage into a digital signal by an A/D converter and, depending on whether the digital value is greater or smaller than a value corresponding to a desired output voltage, the amount of power to be input to the power supply is controlled to maintain constant the value of the output voltage.

Such a multivoltage power supply requires a plurality of A/D converters to output a like plural number of output voltages. This has led to the need for a large circuit, thereby preventing a dimensional reduction of the power supply and causing an increase in the manufacturing cost of the power supply.

SUMMARY OF THE INVENTION

An object of the present invention is to provide a multivoltage power supply which permits control of output voltages by a single A/D converter.

Another object of the present invention is to provide a control method for stably operating the multivoltage power supply.

In one aspect of the present invention, there is thus provided a multivoltage power supply for outputting a plurality of high voltages, comprising:

a like plural number of voltage multiplier units for increasing an input voltage; and a control circuit for outputting a like plural number of drive signals to control said voltage multiplier units, respectively, said control circuit comprising:

a first group of switches for receiving feedback signals from output terminals of the respective voltage multiplier units and sequentially changing over the feedback signals so inputted, an A/D converter connected to output terminals of the respective switches in the first group, a calculating section for calculating digital values, corresponding to desired output voltages which have been stored in advance, and digital values outputted by the A/D converter so that pulse width reference values are outputted, respectively,· timer circuits for receiving the pulse width reference values and outputting at a predetermined frequency drive signals, which comprise pulse signals of widths respectively corresponding to the pulse width reference values to the corresponding voltage multiplier units, and a second group of switches for outputting the pulse width reference values to the corresponding timer circuits.

In another aspect of the present invention, there is also provided a method for controlling a multivoltage power supply having transformers to output a plurality of high voltages, which comprises the following steps:

inputting, as feedback signals, outputs from a like plural number of voltage multiplier units of the multivoltage power supply;

inputting the feedback signals from output terminals of the respective voltage multiplier units, converting the feedback signals into digital values, calculating the digital values and then outputting pulse width reference values;

inputting each pulse width reference value to the corresponding one of the transformers and outputting a drive signal having a pulse width corresponding to the pulse width reference value and a pulsating frequency greater than a resonance frequency determined by the line capacity and winding inductance of secondary windings of the corresponding transformer; and switching an input to the corresponding transformer by the drive signal.

According to the present invention, the difference between each output voltage and its corresponding desired voltage is detected as a digital value by the single A/D converter, thereby making it possible to obtain a switching timing without relying upon parameters such as the inductance and capacitance characteristics of the corresponding transformer. It is accordingly possible to control the plural high voltages by the single control circuit.

Further, each operation for performing control is performed in a digital fashion. This has made it possible to perform the control using a microprocessor or to form the control unit into a logic IC so that the multivoltage power supply can be manufactured in smaller dimensions at lower cost.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
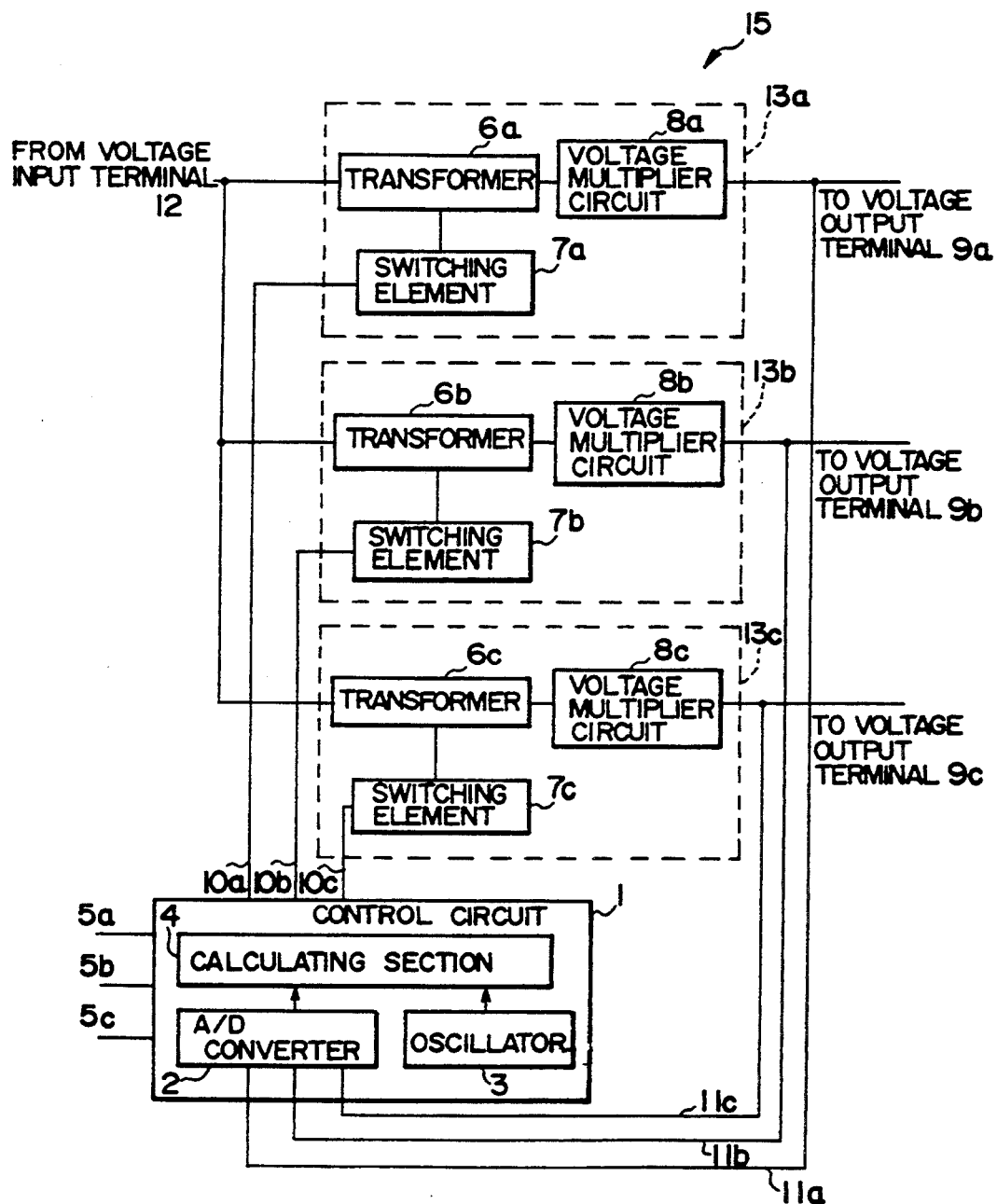
FIG. 1 is a circuit diagram of a multivoltage power supply according to a first embodiment of the present invention.

The multivoltage power supply according to the first embodiment of the present invention will now be described with reference to FIG. 1.

A multivoltage power supply 15 is composed of a voltage multiplier unit 13a for outputting a first voltage, for example, 500 V, another voltage multiplier unit 13b for outputting a second voltage, for example, 300 V, a further voltage multiplier unit 13c for outputting a third voltage, for example, 200 V, and a control circuit 1 for controlling these voltage multiplier units 13a,13b,13c to maintain their output voltages at respective predetermined values.

The control circuit 1 includes an A/D converter 2, a calculating section 4 and an oscillator 3. The A/D converter 2 is connected, for example, to a voltage output terminal 9a of the voltage multiplier unit 13a, whereby the A/D converter 2 receives, as an input:, a feedback signal 11a having a d.c. voltage and converts it into a digital value which indicates the value of the d.c. voltage. The calculating section 4 receives, as inputs, the digital value and a clock signal output from the oscillator 3, and outputs drive signals 10a,10b,10c with a pulse width controlled by a frequency of the oscillator 3.

Control signals 5a,5b,5c, that are input to the control circuit 1, are enable signals which control the control circuit 1 so that the output levels of the drive signals 10a, 10b,10c become effective or ineffective.

The voltage multiplier units 13a,13b,13c are similar in circuit construction. Therefore, describing the voltage multiplier unit 13a as a representative, the voltage multiplier unit 13a is composed of a transformer 6a, a switching element 7a and a voltage multiplier circuit 8a.

The transformer 6a is connected to a voltage input terminal 12 to receive a direct current of a predetermined voltage. When switched by the switching element 7a, the transformer 6a converts the inputted voltage to a high voltage and outputs the latter. The value of the voltage outputted by the transformer 6a is determined by a turns ratio of a coil on an input side to a coil on an output side. The switching element 7a is connected to the input side of the transformer 6a under the control of the drive signal 10a of a predetermined frequency, whereby energy is transmitted from the input side to the output side in the transformer 6a. The drive signal 10a also controls the time during which the input voltage is connected, so that the power to be outputted by the transformer 6a is adjusted. The voltage multiplier circuit 8a smoothens a pulsating current outputted on the output side of the transformer 6a and outputs it as a direct current.

The control circuit 1 will next be described in detail with reference to FIG. 2.

Figure 2:
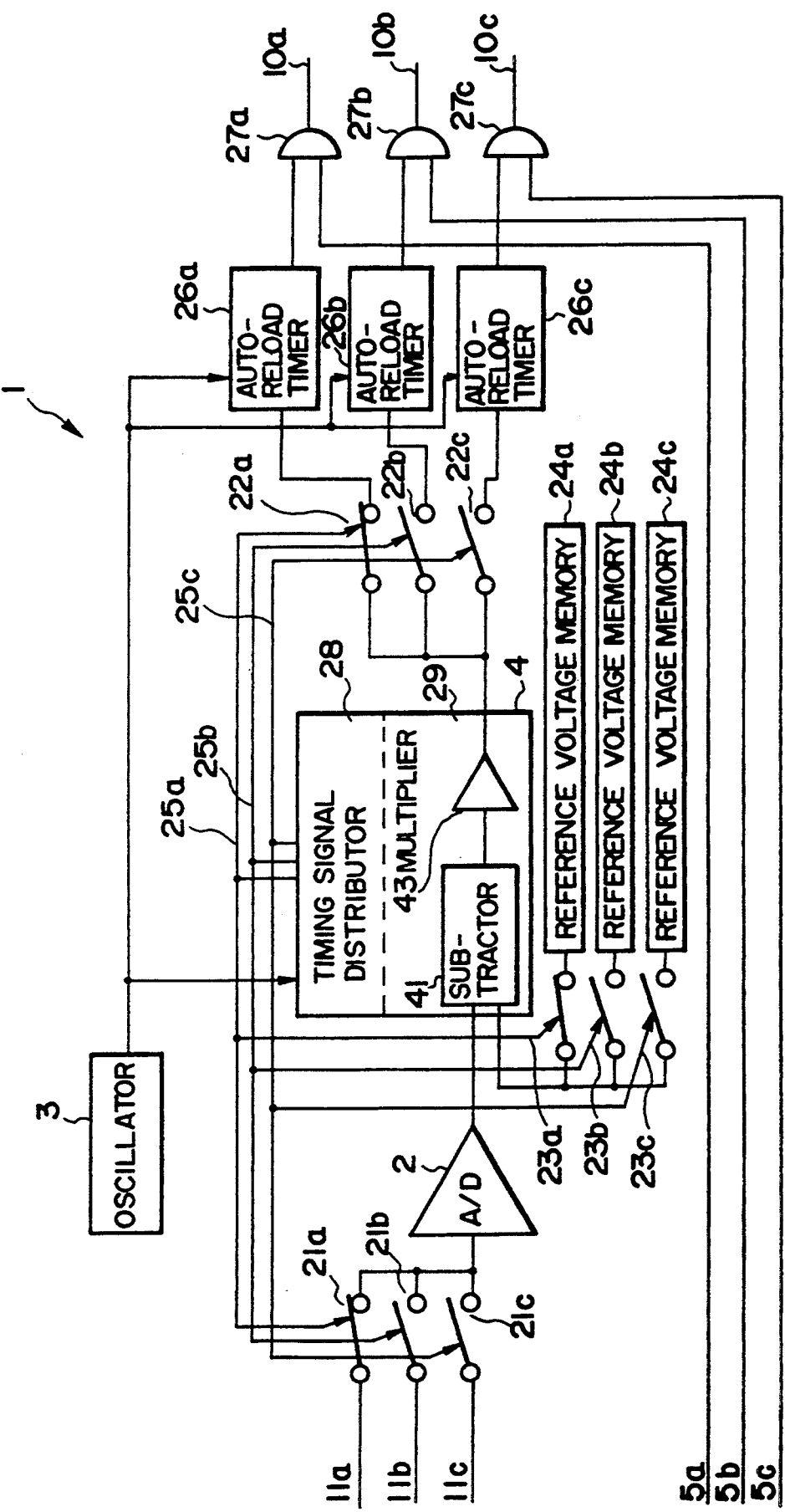
FIG. 2 is a circuit diagram showing a control circuit in detail.

As is illustrated in FIG. 2, the control circuit 1 includes switches 21a,21b,21c respectively connected at one end thereof to receive the feedback signals 11a,11b,11c, and capable of forming at opposite ends thereof a wired OR gate to establish mutual connection. The A/D converter 2 is connected at an input side thereof to the common opposite ends of the switches 21a,21b,21c. Control circuit 1 also includes reference voltage memories 24a,24b,24c in which are stored as digital values voltages to be output from the respective voltage multiplier units 13a,13b,13c. The control circuit 2 further includes switches 23a,23b,23c respectively connected at one end thereof to the reference voltage memories 24a,24b, 24c, and capable of forming at opposite ends thereof a wired OR gate to establish mutual connection. The calculating section 4 is connected to the output side of the A/D converter 2 and also to the common opposite ends of the switches 23a,23b,23c and is capable of outputting values proportional to the differences between the digital value outputted from the A/D converter 2 and the values stored in the respective reference voltage memories 24a,24b,24c. The calculating circuit also is capable of outputting timing signals 25a,25b, 25c. Switches 22a,22b,22c of the control circuit 1 are capable of forming a wired OR gate to establish mutual connections. Auto-reload timers 26a,26b,26c are respectively connected to opposite ends of the switches 22a,22b,22c. The oscillator 3 is connected for feeding a clock signal to the calculating section 4 and the respective auto-reload timers 26a,26b,26c. AND circuits 27a,27b,27c are connected respectively to receive at one input terminal thereof outputs of the corresponding auto-reload timers 26a,26b, 26c and to receive respectively at another input terminal thereof the control signals 5a,5b,5c and to output respectively the drive signals 10a,10b,10c.

The switches 21a,21b,21c, the switches 22a,22b, 22c and the switches 23a,23b,23c form a changeover switch means and are connected so that, by each of the timing signals 25a,25b,25c output by a timing signal distributor 28 in the calculating section 4, only the corresponding switches with reference numeral suffixes a, b or c are turned on.

The A/D converter a receives, for example, the feedback signal 11a selected by the switch 21a and outputs a digital value corresponding to the value of the feedback signal 11a.

The computing section 4 is composed of the timing signal distributor 28 and an arithmetic unit 29. The arithmetic unit 29 in turn has a subtractor 41 and a multiplier 43. The subtractor 41 subtracts, for example, a digital value, which has been outputted by the A/D converter 2, from the value of the reference voltage memory 24a. The multiplier 43 multiplies, for example, the subtracted value by a predetermined value and outputs the product as an initial value of the auto-reload timer 26a.

The auto-reload timers 26a,26b,26c sequentially decrement the output value of the multiplier 43 to zero while outputting logic "H". The auto-reload timers 26a,26b,26c also store the respective initial values and, whenever the clock signal is input from the oscillator 3, reload the respective output values of the multiplier 43 and output respective pulse signals of predetermined pulse widths. Namely, the auto-reload timers 26a,26b,26c generate, at the frequency of the oscillator 3, the drive signals 10a,10b,10c which are composed of the pulse signals of the pulse widths corresponding to the values inputted as the initial values.

The AND circuits 27a,27b,27c output the respective drive signals 10a,10b,10c respectively only when the logic of the respective control signals 5a,5b,5c provided as enable signals are "H".

Operation of multivoltage power supply according to the first embodiment will next be described with reference to the timing chart shown in FIG. 3.

Figure 3:
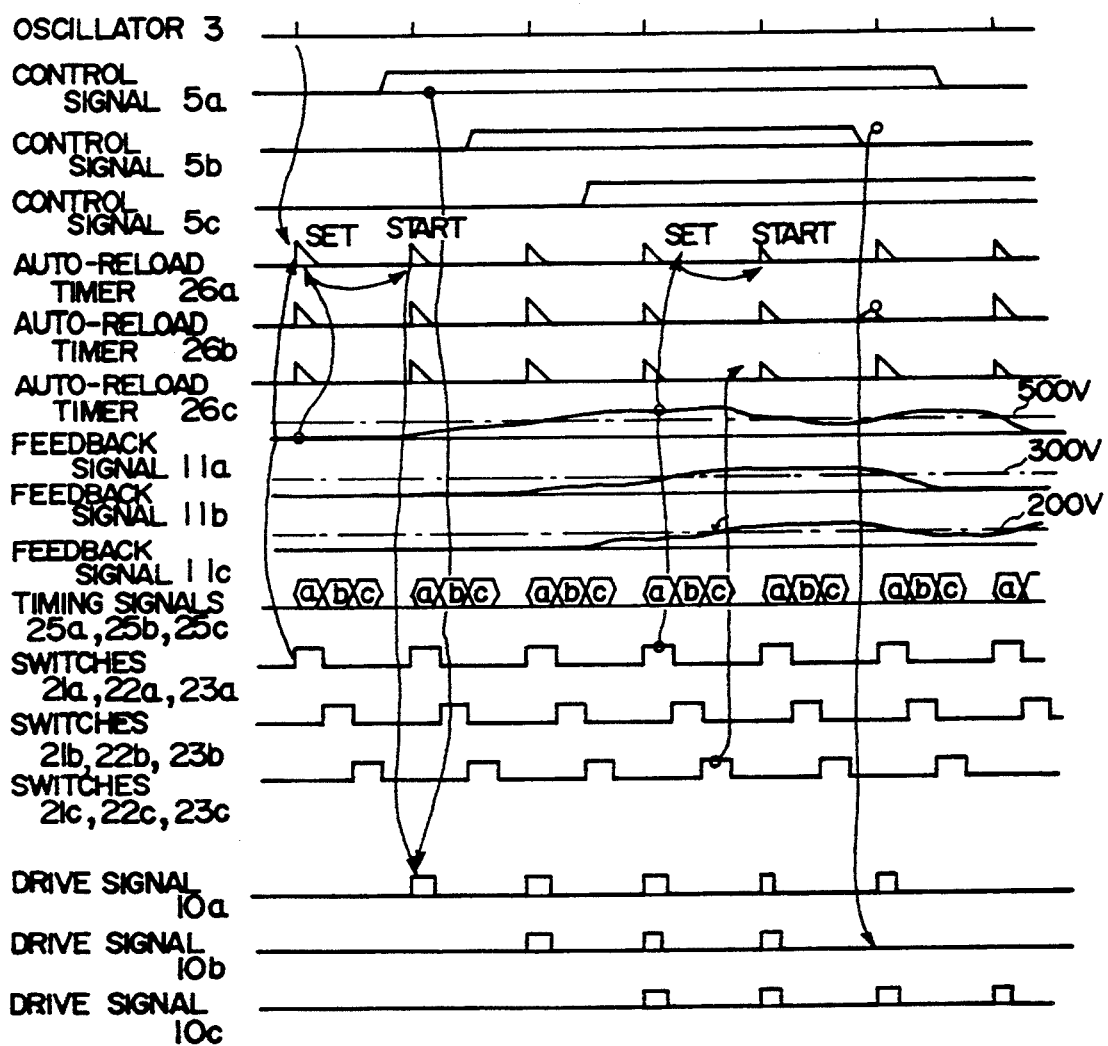
FIG. 3 is a time chart explaining the operation of the multivoltage power supply of the first embodiment.

As is depicted in FIG. 3, the timing circuit 28 shown in FIG. 2 sequentially generates the timing signals 25a,25b,25c. As described above, each of the respective timing signals 25a,25b,25c turns on only the corresponding switches of the switches 21a,21b,21c, the switches 22a,22b, 22c and the switches 23a,23b,23c.

Now assume that the logic of the timing signal 25a has become "H" and the switches 21a,22a,23a have hence been turned on.

When the voltage of the feedback signal 11a, that is, the output of the voltage output terminal 9a is lower than the reference voltage, 500 V, the digital value outputted from the A/D converter 2 shown in FIG. 2 becomes smaller. The subtractor 41 therefore outputs a large value as the difference between the value of the reference voltage memory 24a and the digital value. This difference is a value which indicates how much the voltage of the feedback signal 11a is smaller compared with the value of the reference voltage memory 24a. To make the variation greater by enlarging this value, the value is multiplied by the multiplier 43 so that the product is provided as an initial value of the auto-reload timer 26a.

The auto-reload timer 26a receives and stores the initial value. Using as a trigger the clock signal output by the oscillator 3, the auto-reload timer 26a reads the stored initial value at the timing of the oscillator 3 and outputs logic "H" until the initial value is decremented to zero. Accordingly, the auto-reload timer 26a outputs the drive signal 10a which is composed of a pulse signal whose pulse width becomes greater with an increase in the stored initial value. In other words, the drive signal 10a has with a pulse width which increases as the output voltage of the voltage output terminal 9a becomes smaller compared with the reference voltage, 500 V. The auto-reload timer 26a repeats the above operation whenever the clock signal is input from the oscillator 3, so that the auto-reload timer 26a automatically and continuously outputs the drive signal 10a by reading the previously-stored initial value even when no initial value is input. It is hence understood that the control circuit 1 outputs pulsated signals by subjecting the value of the feedback signal 11a to pulse width modulation.

Incidentally, the drive signal 10a is output through the AND circuit 27a shown in FIG. 2 only when the control signal 5a has logic "H".

The transformer 6a of the voltage multiplier unit 13a depicted in FIG. 1 receives the direct current for a longer time when the pulse width of the drive signal 15a outputted from the control circuit 1 is great but for a shorter time when the pulse width is small. The power to be supplied to the output side therefore can be controlled by the pulse width of the drive signal 15a. Where the output voltage at the voltage output terminal 9a is lower than 500 V, the drive signal 10a is outputted with a pulse width proportional to the difference between the reference voltage of 500 V and the output voltage so that the voltage multiplier unit 13a is controlled to increase the output voltage close to 500 V.

A description will now be made of the value stored in the reference voltage memory 24a. The initial value, which becomes an input to the auto-reload timer 27a for outputting the drive signal 10a, is proportional with the pulse width of the drive signal 10a. It is therefore not preferred that the initial value decreases to zero, because when the initial value becomes 0, the pulse signal is no longer outputted from the auto-reload timer 26a and the input to the transformer 6a stops. For this reason, the value of the reference voltage memory 24a is set at a level somewhat greater than a digital value which is to be output by the A/D converter 2 when the feedback signal 11a is equal to the reference voltage, 500 V, so that the difference is adjusted to maintain the output of the voltage output terminal 9a at 500 V upon output of the difference as the drive signal 10a via the multiplier 43 and the auto-reload timer 26a.

When the voltage of the feedback signal 11a, namely, the output voltage at the voltage output terminal 9a is somewhat higher than the reference voltage, 500 V, the digital value output by the A/D converter 2 shown in FIG. 2 becomes greater so that the difference between the digital value and the value stored in the reference voltage memory 24a becomes smaller. By decreasing the pulse width of the drive signal 10a output by the auto-reload timer 26a and hence shortening the "ON" time of the input to the transformer 6a depicted in FIG. 1, the supply of the power to the output side is decreased so that the output voltage to be output by the voltage output terminal 9a is lowered.

When the voltage of the feedback signal 11a is significantly higher than the reference voltage, 500 V, the digital value output by the A/D converter 2 becomes greater than the value stored in the reference voltage memory 24a. Here, the subtractor 31 outputs 0 (zero). Since the initial value of the auto-reload timer 26a becomes 0, the pulse signal is no longer output. As a consequence, the output voltage drops abruptly.

The multiplying factor of the multiplier 43 controls the gain of the output. A greater multiplying factor enlarges any variation in the pulse width of the drive signal 10a so that the power supply is changed to a greater extent. The gain can therefore be increased.

The operation of the multivoltage power supply according to the first embodiment of this invention has been described above under the assumption that the timing signal 25a is effective. The same description applies equally when the timing signal 25b or 25c becomes logic "H".

As is understood from the foregoing, the first embodiment of the present invention makes it possible to control the voltage by the single A/D converter 2 and arithmetic unit 29 owing to the provision of the switches 21a,21b,21c,22a,22b,22c,23a,23b,23c—which select only the corresponding ones of the feedback signals 11a,11b,11c, the reference voltage memories 24a,24b,24c and the auto-reload timers 26a,26b,26c—and also the timing signal distributor 28 for selecting the corresponding ones of the switches 21a,21b,21c,22a, 22b,22c,23a,23b,23c. Further, the use of the auto-reload timers 26a,26b,26c capable of automatically generating a pulse signal of a predetermined width makes it possible to generate the drive signal 10 independently even when the A/D converter 2 and the arithmetic unit 29 are performing processing of other feedback signals 11a,11b,11c. This permits control by the single control circuit 1 although the multivoltage power supply 15 has the plural voltage output terminals 9.

Here, the oscillation frequency of the oscillator 3, that is, the pulse frequency of each of the drive signal 10a,10b,10c may preferably be set at a value greater than the above-described resonance frequency determined by the line capacity and winding inductance of the secondary windings if one wants to apply a next drive after the resonance of the corresponding transformer 6a, 6b or 6c determined by the line capacity and winding inductance of the secondary windings of the corresponding transformer fully subsides.

The multivoltage power supply 40 according to the second embodiment of the present invention will next be described with reference to FIG. 4.

The second embodiment uses, as a control circuit, a microprocessor 51 (hereinafter called "CPU 51") which has a built-in A/D converter 55. The second embodiment is illustrated under the assumption that the drive times of transformers 6a,6b,6c,6d are determined by programmed calculations by way of example. In addition, it is also illustrated by way of example that output voltages of both the positive and negative polarities are outputted from each voltage output terminal.

Figure 4:
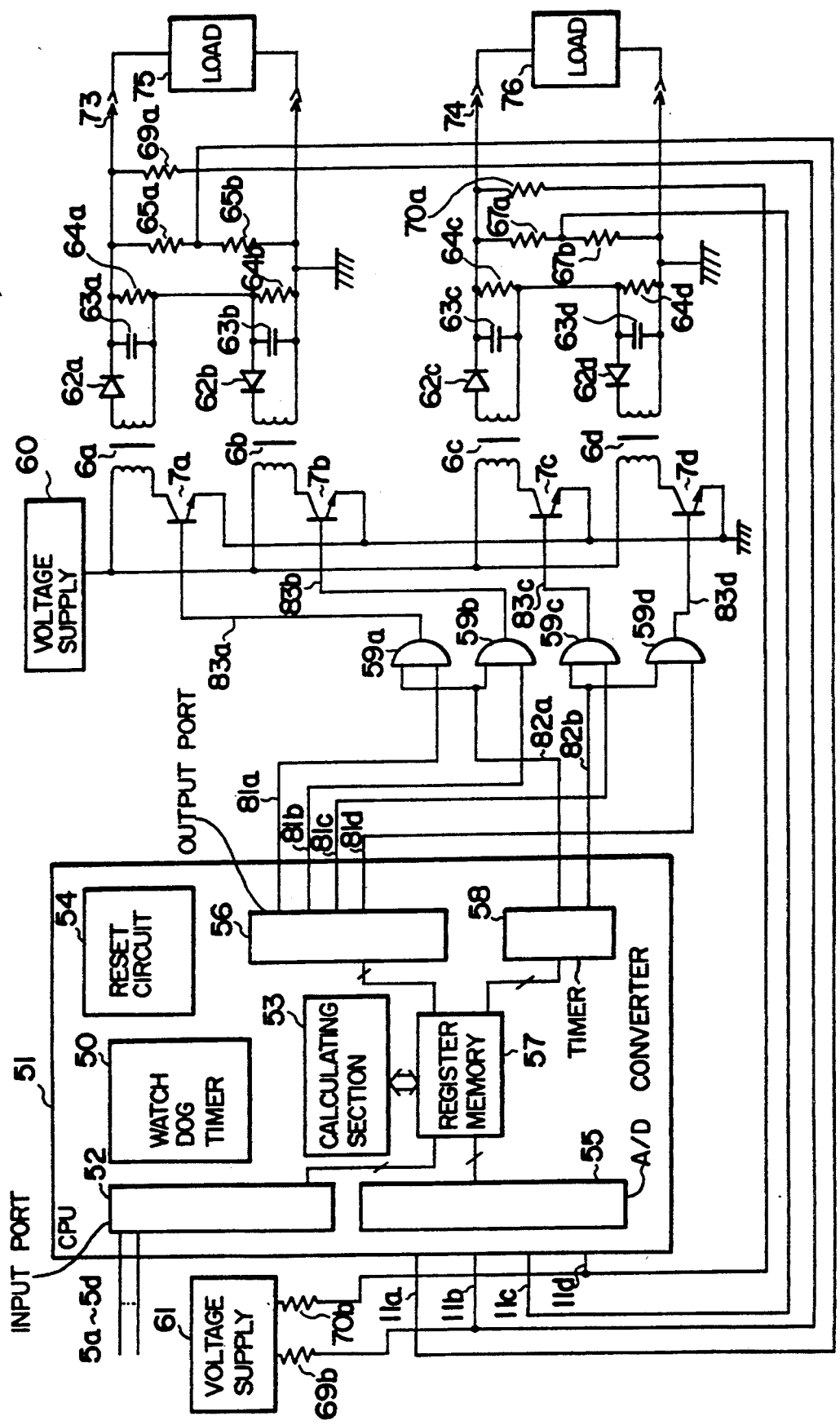
FIG. 4 is a circuit diagram of a multivoltage power supply according to a second embodiment of the present invention.

In FIG. 4, the multivoltage power supply 40 has CPU 51 for receiving control signals 5a,5b,5c,5d and feedback signals 11a,11b,11c,11d and outputting selection signals 81a,81b,81c,81d and pulse signals 82a,82b, AND circuits 59a,59b,59c,59d for receiving the signals 81a, 81b,81c,81d,82a,82b from CPU 51 and outputting drive signals 83a,83b,83c,83d, transformers 6a,6b,6c,6d receiving power from a voltage supply 60, and switching elements 7a,7b,7c,7d for receiving the drive signals 83a,83b,83c,83d and performing on-off control of the supply of the power to the transformers 6a,6b,6c,6d, diodes 62a,62b,62c,62d. Capacitors 63a,63b,63c,63d, resistors 64a,64b,64c,64d, positive-voltage detecting resistors 65a,65b,67a,67b, and negative-voltage detecting resistors 69a,69b,70a,70b in combination, make up two voltage multiplier circuits.

CPU 51 corresponds to the control circuit 1 in the first embodiment. CPU 51 has an input port 52 for receiving the control signals 5a,5b,5c,5d the A/D converter for selectively and sequentially receiving the feedback signals 11a,11b,11c,11d and converting them into digital values, and a register memory 57 for storing these input values and digital values.

Plural values having similar significance to the values stored in each of the reference voltage memories 24a,24b,24c have been stored beforehand in the register memory 57. These values are used by changing them over in accordance with the values of voltages to be output. As an alternative, it is also possible to use only one value by dividing the value of each outputted voltage and feeding it back so that a voltage provided as the feedback signal 11a, 11b, 11c or 11d is controlled to remain, for example, at 2.5 V when the output voltage is at the desired voltage.

CPU 51 also has a calculating section 53 and a timer 58 so that a digital value—which has been obtained from a value stored in the register memory 57 and representing a reference voltage by converting it at the A/D converter—is subtracted. The value so obtained is set at the timer 58. Timer 58 is composed of a program having a similar function to the auto-reload timers in the first embodiment, and outputs a pulse signal having a predetermined pulse width.

An output port 56 of CPU 51 outputs the selection signals 81a,81b,81c,81d to the corresponding AND circuits 59a,59b,59c,59d to control the outputting of the drive signals 83a,83b,83c,83d to be either effective or ineffective.

Operation of the second embodiment of this invention will hereafter be described.

Now assume that the drive signal 83a as an output of the AND circuit 59a is effective and a pulse signal of a predetermined pulse width is fed to the switching element 7a. As a consequence, the voltage of the voltage supply 60 is increased by the transformer 6a and a high voltage is output to a side of a secondary coil. The voltage so output is rectified by the diode 62a so that a voltage of positive polarity is provided at from the voltage output terminal 73. The flow path of the current at this time extends from an upper end of the capacitor 63a to a lower end of the capacitor 63a via a load 75 and the resistor 64b. Accordingly, the resistor 64a acts as internal load resistance for the multivoltage power supply 40.

The value at the voltage output terminal 73 is divided by the positive-voltage detecting resistor 65a and the positive-voltage detecting resistor 65b and, when the desired voltage is applied there, is fed back as the 2.5 V feedback signal 11a. Therefore, when the feedback signal 11a so fed back is higher than 2.5 V, a voltage higher than the desired voltage is input to the load. When the feedback signal 11a is lower than 2.5 V, a voltage lower than the desired voltage is output to the load.

CPU 51 receives the feedback signal 11a with 10 predetermined timing and inputs it to the A/D converter 55. The feedback signal 11a is hence converted to a digital value, which is then stored in the register memory 57. Subtraction is then performed between this digital value and the digital value stored in another region of the register memory 57 and indicating the reference voltage value of 2.5 V, followed by multiplication of the difference so determined. The result is input as an initial value to the timer 58, as in the first embodiment. Different from the auto-reload timers in the first embodiment, the timer 58 does not store the initial value therein, but receives with the initial value at a predetermined timing from the register memory 57 and outputs a pulse signal.

A description will next be made of the operation of the multivoltage power supply according to the second embodiment of the present invention under the assumption that the drive signal 83b as the output of the AND circuit 59b is effective. In this case, the voltage of the voltage supply 60 is increased by the transformer 6b and a high voltage is outputted to the side of the secondary coil. The voltage so across the secondary coil rectified by the diode 62b so that a voltage of negative polarity is provided at the voltage output terminal 73. The flow path of the current at this time extends from a lower end of the capacitor 63b to an upper end of the capacitor 63b via the load 75 and the resistor 64a. Accordingly, the resistor 64b acts as internal load resistance for the multivoltage power supply 40.

The value of the voltage at the voltage output terminal 73 is divided by the negative-voltage detecting resistor 69a and the negative-voltage detecting resistor 69b between the value of the negative voltage and the value of the positive voltage of the voltage supply 61 in such a way that, when the desired voltage of negative polarity is applied to the load 75, the voltage at the voltage output terminal 73 is fed back as the 2.5 V feedback signal 11b. Therefore, when the feedback signal 11b so fed back is higher than 2.5 V, a voltage smaller in the negative direction than the desired voltage of negative polarity is input to the load in contrast to the above-described operation. When the feedback signal 11b is lower than 2.5 V, a voltage greater in the negative direction than the desired voltage of negative polarity is input to the load.

CPU 51 similarly receives the feedback signal 11b with a predetermined timing and inputs it to the A/D converter 55. The feedback signal 11b is hence converted to a digital value, which is then stored in the register memory 57. Subtraction is then performed between this digital value and the digital value stored in another region of the register memory 57 and indicating the reference voltage value of 2.5 V, followed by multiplication of the difference so determined. The result is set as an initial value at the timer 58, as in the first embodiment. As in the first embodiment, the timer 58 outputs a pulse of a predetermined pulse width in accordance with the set initial value.

The operation of the multivoltage power supply according to the second embodiment of the present invention has been described above under the assumption that a voltage is output from the voltage output terminal 73. The multivoltage power supply of the second embodiment operates likewise when a voltage is output from the voltage output terminal 74.

According to the program of CPU 51 in the second embodiment, the control is effected so that only one of the two multiplier circuits is driven in accordance with a predetermined order of priority, even when a drive control signal of positive polarity and a drive control signal of negative polarity are simultaneously output due to a trouble on the side from which the control signals 5a,5b,5c,5d are output.

If CPU 51 shown in FIG. 4 is caused to operate without control due to noise or an external disturbance, monitoring is performed by a watch dog timer 50 and, upon detection of any runaway, CPU 51 is reset by a reset circuit 54. This resetting is conducted by controlling CPU 51 so that the output of all the high voltages is once stopped and signals consistent with the state of the input port 52 can be output again. CPU 51 can be restored even when it is caused to operate without control.

What is claimed is:

1. A multivoltage power supply for outputting a plurality of high voltages, comprising:
   a like plural number of voltage multiplier units for increasing an inputted voltage; and
   a control circuit for outputting a like plural number of drive signals to control said voltage multiplier units, respectively, said control circuit including
      a first group of switches for receiving feedback signals based on voltages from output terminals of the respective voltage multiplier units and sequentially changing over the feedback signals so received,
      an A/D converter connected to output terminals of the respective switches in the first group,
      a calculating section for calculating and outputting digital pulse width reference values, based on stored digital data corresponding to desired output voltages and stored in advance, and digital values output by the A/D converter,
      timer circuits, corresponding to respective ones of the voltage multiplier units the timer circuits receiving the pulse width reference values and outputting drive signals to the corresponding multiplier units at a predetermined frequency, the drive signals comprising pulse signals of widths respectively corresponding to the pulse width reference values, and
      a second group of switches for outputting the pulse width reference values to the corresponding timer circuits.

2. A multivoltage power supply according to claim 1, wherein said timer circuits are auto-reload timers.

3. A multivoltage power supply according to claim 1, wherein the stored digital values are digital values corresponding to voltages to be outputted.

4. A multivoltage power supply according to claim 1, wherein the feedback signals have voltages obtained by dividing the corresponding output voltages by amounts corresponding to desired levels of the output voltages, and the stored digital data is a single common value for use in calculating all of the pulse width reference values.

5. A multivoltage power supply according to claim 1, wherein the control circuit is composed of a microprocessor.

6. A method for controlling a multivoltage power supply having transformers to output a plurality of high voltages, which comprises the following steps:
   generating feedback signals based on output voltages from a like plural number of voltage multiplier units of the multivoltage power supply;
   converting the feedback signals into digital values, calculating further digital values and then generating pulse width reference values based on the calculated further digital values;
   generating a plurality Of drive Signals, each drive signal having a pulse width corresponding to a respective one of the pulse width reference values and a pulse rate greater than a resonance frequency determined by the line capacity and winding inductance of a secondary winding of a respective one of the transformers; and
   switching an input to the corresponding transformers by the drive signals.

7. A method according to claim 6, wherein said step of calculating the further digital signals includes calculating the further digital values based on both the digital signals converted from the feedback signals and data stored in advance, said step of generating feedback signals comprising the step of dividing output voltages of the respective multiplier units by amounts corresponding to ratios of desired levels of the output voltages to an input voltage that is supplied to each of the transformers, and wherein the data stored in advance is a single common value which is indicative of the desired levels of the output voltages.

8. A multivoltage power supply according to claim 1, wherein said control circuit further comprises means for producing the feedback signals by dividing the output voltages of the respective multiplier units by amounts corresponding to ratios of the desired output voltages to the input voltage, and means storing the stored data indicative of desired output voltages as a single common value.

9. A multivoltage power supply for receiving an input voltage and outputting a plurality of high voltages, comprising:
   a predetermined plural number of voltage multiplier units, each multiplier unit including means for providing at a respective output terminal thereof an output voltage greater than the input voltage; and
   control circuit means, coupled to said multiplier units, for producing and providing to said multiplier units a plurality of drive signals, the drive signals being equal in number to said predetermined number, each drive signal being used to control a corresponding one of said multiplier units, said control circuit means including
      an A/D converter,
      calculating section means for calculating and outputting digital pulse width reference values based on both (1) data indicative of desired output voltages and stored in advance and (2) digital values output by said A/D converter,
      timer circuit means, responsive to the pulse width reference values, for generating the drive signals at a predetermined frequency in the form of pulse signals having widths corresponding to the pulse width reference values, and
      means for sequentially applying feedback signals, based on output voltages of the respective multiplier units, to said A/D converter, and sequentially inputting the pulse width reference values to the respective time circuit means.

10. A multivoltage power supply according to claim 9, wherein said control circuit means further comprises means for producing the feedback signals by dividing the output voltages of the respective multiplier units by amounts corresponding to ratios of the desired output voltages to the input voltage, and the stored data indicative of desired output voltages is a single common value.

11. A multivoltage power supply according to claim 9, wherein said timer means comprises a plurality of timer circuits, said means for sequentially applying feedback signals comprising a changeover switch means, said changeover switch means including means for sequentially applying said pulse width reference signals to said timer circuits.

* * * * *